United States Patent Office 3,375,240
Patented Mar. 26, 1968

3,375,240
METAL-CONTAINING DYESTUFFS
Fabio Beffa, Basel, Paul Lienhard, Riehen, and Eginhard Steiner, Basel, Switzerland, assignors to J. R. Geigy A.G., Basel, Switzerland
No Drawing. Filed Oct. 5, 1964, Ser. No. 401,664
Claims priority, application Switzerland, Oct. 11, 1963, 12,538/63
9 Claims. (Cl. 260—145)

ABSTRACT OF THE DISCLOSURE

Metal complex dyestuffs of good dyeing properties consisting essentially of a mixture of (a) a bicyclically metallized dyestuff moiety and (b) a bicyclically metallized formazane moiety, the mixture being complexed with Co or Cr as the metal, and molar ratio of (a) to (b) ranging from 2:1 to 1:2. Moiety (a) is the residue of a monoazo dye, of a disazo dye or of an azomethine dye.

---

The present invention concerns new metal-containing dyestuffs, processes for the production thereof, their use for the coloring, and especially the dyeing of polyamide-type fibers as well as, as industrial products, the materials dyed with the aid of these dyestuffs.

It is known that valuable chromium- and cobalt-containing dyestuffs are obtained if an agent giving off chromium or cobalt is reacted with an azo, azomethine or formazane dyestuff capable of forming bicyclic metal complexes, whereby chromium- or cobalt-complex compounds which contain two molecules of azo, azomethine or formazane dyestuff bound bicyclically to one chromium or cobalt atom are obtained.

It has now been found that new chromium- or cobalt-containing dyestuffs having very good dyeing properties, in particular very good color yield, great fastness to light and unexpectedly high water solubility, are obtained by reacting at least one azo or azomethine compound capable of forming bicyclic heavy metal complexes, preferably an azo compound and at least one formazane compound forming bicyclic heavy metal complexes, with an agent giving off chromium or cobalt to form a complex compound which contains one molecule of bicyclically bound azo or azomethine compound and one molecule of bicyclically bound formazane compound bound to one atom of chromium or cobalt.

Because of the greatly differing constitutions of azo and azomethine dyestuffs on the one hand and of formazane dyestuffs on the other, it would have been expected that only symmetrical azo or azomethine and symmetrical formazane complex dyestuffs would be formed; therefore the formation of unsymmetrical complex dyestuffs of the type defined is very surprising.

Azo compounds forming bicyclic metal complexes are chiefly those which correspond to the formula

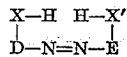

In this formula

D represents a radical of the benzene or naphthalene series containing the substituent H—X in a position adjacent to the azo bond, E represents the radical of a coupling component coupled in a position adjacent to H—X', X—H represents the hydroxyl or carboxyl group or a substituent which can be converted into such a group, and X'—H represents the hydroxyl group or the primary or a secondary amino group.

Preferably, D is a radical of the benzene series. E is for example the radical of a benzene, naphthalene or 1-arylpyrazole compound.

D and E can contain the substituents usual in dyestuffs, for example, nucleophilic substituents such as hydrocarbon, particularly lower alkyl groups, ether groups, preferably lower alkoxy groups, acylamino, especially alkanoylamino groups, or electrophilic substituents such as halogens, e.g. fluorine, chlorine or bromine, carboxyl and sulfonic acid groups, as well as functional derivatives thereof, e.g. carboxylic acid and sulfonic acid amide groups optionally substituted at the nitrogen atom, carboxylic acid and sulfonic acid ester groups, the nitro, cyano or trifluoromethyl group, arylazo groups or acyl groups such as lower alkanoyl, aroyl, especially benzoyl, lower alkylsulfonyl or arylsulfonyl, especially phenylsulfonyl groups.

The aromatic rings which may occur in these substituents can also be correspondingly substituted.

Lower alkoxy groups or acyloxy, especially phenylsulfonyloxy groups such as the p-methylphenylsulfonyloxy group, are examples of the case when X—H in Formula I is a substituent which can be converted into a hydroxyl group. If X—H is a substituent which can be converted into a carboxyl group, then it is, for example, a carboxylic acid ester group, particularly a lower alkoxycarbonyl group.

Preferably X—H is the hydroxyl group and H—X' is the hydroxyl, the primary amino or a lower alkylamino group the alkyl radical of which can be substituted, for instance, by hydroxyl or lower alkoxy.

Preferred azomethine compounds forming bicyclic metal complexes are those of the formula.

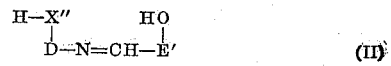

wherein

D and E' each represent a radical of the benzene or naphthalene series containing H—X" or the hydroxyl group in a position adjacent to the azomethine bond, and H—X" represents the carboxyl group or, preferably, the hydroxyl group.

D and E' are preferably radicals of the benzene series.

The azomethine dyestuffs of Formula II can contain the substituents usual in dyestuffs, in particular those mentioned in the description of azo dyestuffs of Formula I.

Such azomethine compounds are obtained by the usual methods by condensing an o-aminophenol or o-aminonaphthol with an o-hydroxyaldehyde of the benzene or naphthalene series.

As formazane compounds usable according to the invention, fundamentally all formazanes forming co-ordinative trivalent metal complexes are used. Formazane compounds which are particularly favorable are those of the formula

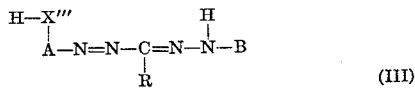

wherein

A and B each represents a radical of the benzene or naphthalene series, A containing the substituent H—X''' in a position adjacent to the azo bond, R represents an alkyl or alkenyl radical which may contain inert substituents, a cycloaliphatic or a carbocyclic or heterocyclic aromatic radical, an acyl radical, the nitro, or the cyano group, and H—X''' represents a metallizable group, particularly the hydroxyl or carboxyl group.

If R is an unsubstituted alkyl radical, then this advantageously has 1 to 7 carbon atoms. As defined, this radical can contain inert substituents, e.g. halogen, such as fluorine or chlorine, the hydroxyl, cyano or a low alkoxy group. When R is an alkenyl radical it chiefly contains 2 to 4 carbon atoms; if R is a carbocyclic aromatic radical then it is chiefly a radical of the benzene or naphthalene series. If R is a heterocyclic aromatic radical this has, in particular, 5- or 6- ring members and as hetero atoms it preferably contains nitrogen, oxygen and/or sulphur. These heterocycles can form condensed rings either among themselves or with carbocycles. If R is an acyl radical then it is particularly an aliphatic carboxylic acid radical such as acetyl, propionyl or a butyryl, the radical of a homocyclic aromatic carboxylic acid such as benzoic acid, or of an organic sulfonic acid such as methane sulfonic acid or benzene sulfonic acid, or of a carbamic acid containing an N-carbocyclic aromatic substituent.

Preferably A and B are each a radical of the benzene series and R is a radical of the benzene or naphthalene series.

The formazane dyestuffs of Formula III can contain the ring substituents usual in dyestuffs, for example the substituents mentioned more in detail hereinafter. It is particularly advantageous if these formazanes contain water solubilizing groups, in particular one or more sulfonic acid, sulfonic acid amide and/or low alkylsulfonyl groups, preferably methylsulfonyl or ethylsulfonyl groups.

The formazanes of Formula III are obtained by methods known per se. For example, an aldehyde is condensed with the hydrazine from one of the two amines H—X'''—A—NH$_2$ or B—NH$_2$ (preferably with the hydrazine obtained from the amine B—NH$_2$) to form the hydrazone and this is coupled with a diazonium compound from the other amine. Or, for example, an equivalent of a diazonium compound from one of the amines given above is coupled with one equivalent of a methylene or methine compound which can be coupled twice while splitting off 2 groups or 1 group which can easily be split off or groups which can be converted into such groups, such as the formyl, acetyl, carboxylic acid group or a carboxylic acid ester, amide or nitrile group.

A preferred group of cobalt metal-complex dyestuffs according to the invention are those in which a dyestuff of Formula I or II is complexed with cobalt and with one of the following formazane dyestuffs falling under Formula III:

(a) Formazanes of the formula

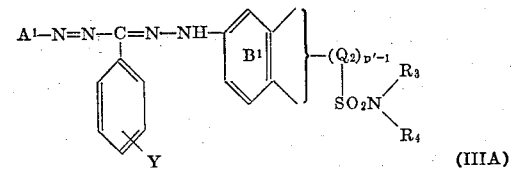

wherein each of R$_3$ and R$_4$ represents, independently of the other R, hydrogen, lower alkyl, cyano-lower alkyl, hydroxy-lower alkyl or lower alkoxy-lower alkyl;

Q$_2$ represents a bridge member which is phenylene-sulfonyl, N-phenylene-aminosulfonyl, or N-lower alkyl-N-phenylene-aminosulfonyl, said bridge member being linked via its sulfonyl moiety to the ring B$^1$;

A$^1$ represents one of the radicals of the formulas

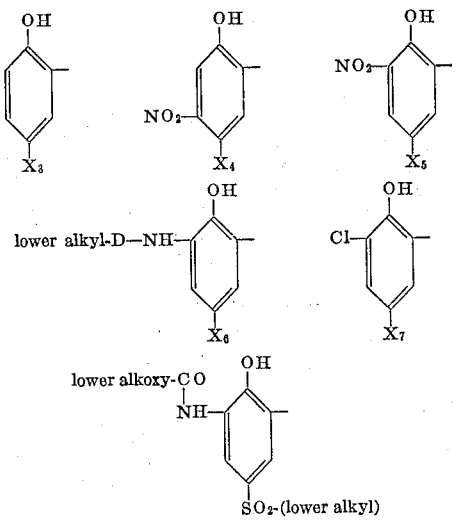

X$_3$ being nitrol, chloro, bromo, alkyl of from 1 to 5 carbon atoms, lower alkyl-sulfonyl, lower alkanoylamino, N-lower alkyl-N-lower alkanoylamino, lower alkylsulfonylamino or N-lower alkyl-N-lower alkylsulfonylamino;

X$_4$ being chlorine, bromine or lower alkylsulfonyl,

X$_5$ being chlorine, bromine, nitro or lower alkylsulfonyl,

X$_6$ being nitro or lower alkylsulfonyl,

X$_7$ being chlorine, or nitro,

Y represents hydrogen, chlorine, bromine, lower alkyl, lower alkoxy or nitro,

D represents —CO— or —SO$_2$—, and p' is an integer ranging from 1 to 2.

(b) Formazanes of the formula

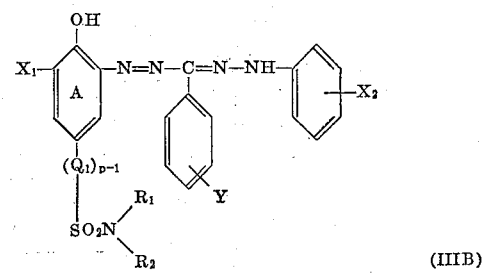

wherein each of R$_1$ and R$_2$ represents, independently of the other R, hydrogen, lower alkyl, cyano-lower alkyl, hydroxy-lower alkyl or lower alkoxy-lower alkyl;

Q$_1$ represents a bridge member which is phenylene-sulfonyl, N-phenylene-aminosulfonyl, or N-lower alkyl-N-phenylene-aminosulfonyl, said bridge member being linked via its sulfonyl moiety to the ring A;

p is an integer ranging from 1 to 2,

X$_1$ is hydrogen or nitro;

X$_2$ is hydrogen, nitro, chlorine, bromine, lower alkoxy or lower alkyl; and

Y is hydrogen, chlorine, bromine, lower alkyl, lower alkoxy or nitro;

(c) Formazanes of the formula

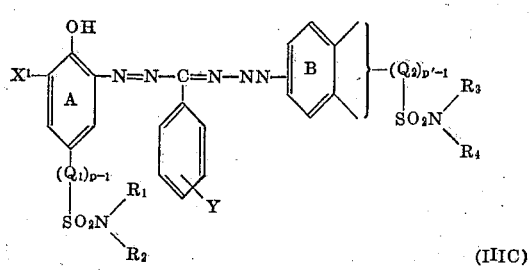

(IIIC)

wherein each of $R_1$, $R_2$, $R_3$ and $R_4$ represents, independently of the other R's, hydrogen, lower alkyl, cyano-lower alkyl, hydroxy-lower alkyl or lower alkoxy-lower alkyl, Each of $Q_1$ and $Q_2$ represents a bridging member which is phenylenesulfonyl, N-phenylene-aminosulfonyl, or N-lower alkyl-N-phenylene-aminosulfonyl, said bridging member being linked via its sulfonyl moiety to the rings A and B, respectively, Of $p$ and $p'$ one is 1 and the other is an integer ranging from 1 to 2, Y represents hydrogen, chlorine, bromine, lower alkyl, lower alkoxy or nitro, And $X_1$ represents hydrogen or nitro.

(d) Formazanes of the formula

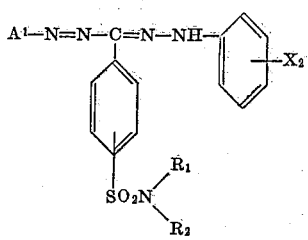

(IIID)

wherein each of $R_1$ and $R_2$ represents, independently of the other, hydrogen, lower alkyl, cyano-lower alkyl, hydroxy-lower alkyl or lower alkoxy-lower alkyl, And wherein $A^1$ and $X_2$ have the meanings given hereinbefore; or (e) Formazanes of the formula

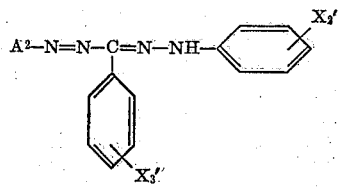

(IIIE)

wherein $A^2$ is one of the radicals

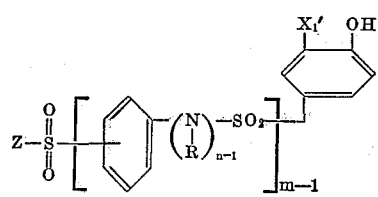

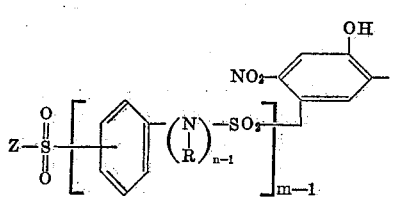

and

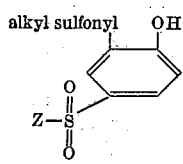

$X_1'$ represents hydrogen, lower alkanoylamino, lower alkoxy-carbonylamino, lower alkylsulfonylamino, lower alkylsulfonyl or nitro.

$X_2'$ represents hydrogen, chlorine, bromine, lower alkyl, lower alkoxy or nitro, $X_3'$ represents hydrogen, lower alkoxy, lower alkyl, chlorine or bromine, R represents hydrogen, or lower alkyl, Z represents alkyl, mono-chloro-methyl or trifluoro-methyl, and each of $m$ and $n$ is an integer ranging from 1 to 2.

"Lower" used in this specification and in the appended claims in connection with an aliphatic radical means that this radical has at least one and not more than 4 carbon atoms.

According to a first, preferred aspect of the invention a cobalt metal complex dyestuff which is preferably capable of dyeing polyamide-type fibers from a neutral to weakly acid bath is obtained by reacting (a) an agent giving off cobalt simultaneously with
(b) at least one azo dyestuff or azomethine dyestuff compound which forms bicyclic metal complexes and
(c) at least one formazane compound which forms bicyclic metal complexes, in a reaction medium in which the reaction between the aforesaid three reactants takes place substantially concurrently and as rapidly as possible, so as to avoid any substantial decomposition or oxidation of the formazane reactant, the ratio of $(b):(c)$ being such that usually at least about 10%, and preferably about 25%, by weight of the total cobalt complex dyestuff obtained consists of a cobalt complex compound which contains one molecule of bicyclically bound azo or azomethine compound and one molecule of bicyclically bound formazane compound to one cobalt atom, i.e. a compound of the formula

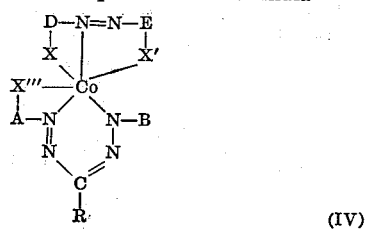

(IV)

in the case of the reactant $(b)$ being an azo dyestuff compound; or of the formula

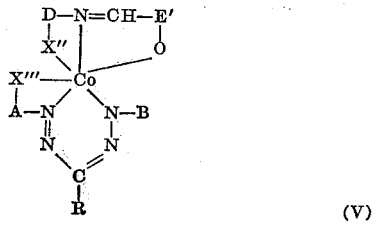

(V)

in the case of reactant $(b)$ being an azomethine dyestuff compound.

The reaction is preferably performed in the presence of an acid binding agent such as sodium or potassium acetate or carbonate. Suitable reaction media are e.g. amides of lower fatty acids such as formamide or dimethyl formamide, or higher boiling alcohols such as alkanols of from 3 to 7 carbon atoms or alkylene glycols or their lower monoalkyl ethers such as Cellosolve. If necessary, the reaction can also be performed in the presence of compounds which form soluble complex compounds with the chromium or cobalt salts in an alkaline medium, for example in the presence of tartaric acid, citric acid, lactic acid or salicylic acid.

The above-defined content of mixed complex compounds of Formulas IV or V, respectively, is attained by using the reactants (b) and (c) in a suitable molar ratio which is in the range between the ratios 4:1 and 1:4, and preferably at approximately 1:1.

According to another aspect of the invention, a chromium metal complex dyestuff the formula of which is equal to Formulas IV or V, except that the central cobalt atom is replaced by a chromium atom, is obtained in a similar manner, but using as reactant (a) an agent giving off chromium.

Preferably, however, the production of a chromium metal mixed complex dyestuff which is preferably capable of dyeing polyamide-type fibers from a neutral to weakly acid bath, is carried out according to a third aspect of the invention, which comprises (a) First reacting
   (i) An agent giving off chromium with
   (ii) At least one azo or azomethine dyestuff as defined to form a chromium complex compound which contains one molecule of the dyestuff mentioned to one chromium atom, this reaction step being preferably performed at temperatures of 100–140° C., in an open vessel or under excess pressure above ambient pressure, in particular in water or in an organic solvent such as an alcohol, and in an acid medium; and then (b) Reacting the resulting 1:1 chromium complex compound with
   (iii) At least one formazane dyestuff as defined in Formula III to form a chromium complex compound containing one molecule of bicyclically bound azo or azomethine compound and one molecule of bicyclically bound formazane compound to one chromium atom, this second step being also advantageously performed in aqueous or organic reaction medium, but in a neutral or, often more advantageously, in an alkaline pH range in the presence of acid binding agents such as potassium or sodium acetate, carbonate or dilute sodium or potassium hydroxide solution.

In this case, the content of mixed chromium complex dyestuff compound of the formula

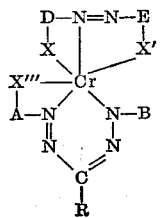

(VI)

or of the formula

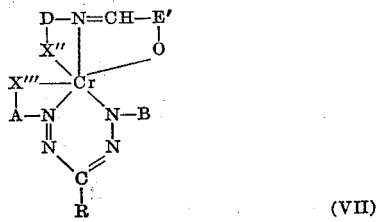

(VII)

respectively should be at least about 60% and preferably above 90% by weight of the total complex mixed dyestuff obtained.

The simple salts of chromium such as chromic fluoride, acetate, formate or sulfate or potassium or ammonium chromic sulfate, for example, are preferably used as agents giving off chromium; suitable agents giving off cobalt are simple cobalt salts, e.g. cobalt acetate, formate or sulfate.

The reaction of the agents giving off chromium or cobalt with the azo, azomethine and formazane compounds as defined is performed depending on the mode of operation chosen, e.g. in aqueous slurry, solution or in the melt, e.g. in the melt of the alkali metal salt of a low fatty acid, advantageously however, in an organic solvent.

Mixtures of such metal-containing mixed complex compounds according to the invention can be produced by the process according to the invention by treating two or more of the mixtures of dyestuff reactants of Formulas I, II and III defined above with suitable proportions of agents giving off chromium or cobalt of the type defined.

Polyamide-type fiber materials dyed with the cobalt and chromium mixed complex dyestuffs according to the invention are distinguished in particular by their fastness to light, wet fastness including fastness to washing, milling, alkali and sea water, and fastness to rubbing and decatizing, as well as by the level aspect due to uniformity of the dyeings.

The new metal-containing dyestuffs which contain no water solubilizing groups can be used for the dyeing of plastics, lacquers, varnishes or spinning masses obtained from acetyl cellulose or polyamides.

Those dyestuffs according to the invention which contain water-solubilizing groups such as carboxylic acid or phosphonic acid and, mainly, sulfonic acid groups, are suitable for the dyeing and printing of organic fibers, particularly those containing polyamide, e.g. natural polypeptide material such as leather, wool or silk, or synthetic polyamide fibers such as nylon or polyurethane fibers. For the dyeing of this type of material, those chromium- or cobalt-containing dyestuffs according to the invention are particularly suitable which contain at most one sulfonic acid group; they are distinguished by an unexpectedly high water-solubility; in many cases they draw onto this material even from a neutral to weakly acid bath. Another valuable group is formed by those dyestuffs according to the invention which contain no groups which dissociate acid, in particular no carboxylic acid or sulfonic acid groups apart from those taking part in the complex formation, but owe their water solubility to low alkylsulfonyl groups, the sulfonic acid amide group, and to the sulfonic acid amide groups substituted by low aliphatic radicals. These dyestuffs have very good affinity to wool and polyamide material having dyeing properties similar thereto and they draw completely onto such material from even a neutral to weakly acid bath.

In many cases the water solubility of such dyestuffs containing no sulfonic acid groups can be favorably affected by admixture with anion-active or non-ionogenic wetting or dispersing agents.

The invention is further illustrated by the following non-limitative examples. Where not otherwise expressly stated, parts and percentages are given therein by weight. The temperatures are in degrees Centigrade. The relationship of parts by weight to parts by volume is as that of grams (g.) to milliliters (ml.).

*Example 1*

Cobalt Complex

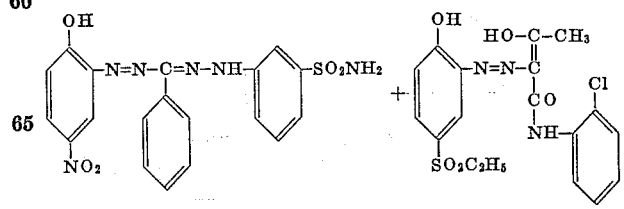

15 parts of cobalt acetate (corresponding to 3.54 parts of cobalt) are added at 80–85° to 22 parts of the formazane dyestuff obtained by coupling an equimolecular amount of 4-nitro-2-diazo - 1 - hydroxybenzene with the benzaldehyde phenyl hydrazone-3-sulfonic acid amide and 21.2 parts of the monoazo dyestuff obtained from 2-diazo- 1-hydroxybenzene-4-ethyl sulfone and acetoacetic acid o-chloranilide, to which dyestuff mixture 300 parts of formamide have been added. The whole is kept at 80–85° until metal complex formation is complete. The cobalt-containing dyestuff is precipitated by the addition of sodium chloride solution, filtered off and dried.

It is a dark powder which dyes wool from a neutral to weakly acid bath in yellowish olive green shades. The dyeings are of great depth of shade, and have good wet fastness properties and very good fastness to light.

By using in the above example, the formazane dyestuff and azo dyestuff in amounts of 13.2 and 29.7 parts, respectively, instead of 22 and 21.2 parts, with otherwise the same procedure, a more yellowish dyestuff is obtained. A more greyish dyestuff also having good properties is obtained by using in this example the formazane dyestuff and the azo dyestuff in amounts of 30.8 parts and 12.7 parts, respectively, and otherwise following the same procedure.

Dyestuffs having similar properties are obtained if in the above example, the dyestuff from 2-diazo-1-hydroxybenzene-4-ethyl sulfone and acetoacetic acid-o-chloranilide is replaced by 21.2 parts of monoazo dyestuff from 2-diazo-1-hydroxybenzene-4-ethyl sulfone and acetoacetic acid-m-chloranilide or by 19.5 parts of monoazo dyestuff from 2-diazo-1-hydroxybenzene-4-ethyl sulfone and acetoacetic acid anilide or by 18.8 parts of monoazo dyestuff from 4-nitro-2-diazo-1-hydroxybenzene and acetoacetic acid-o-chloranilide.

Example 2

Cobalt Complex

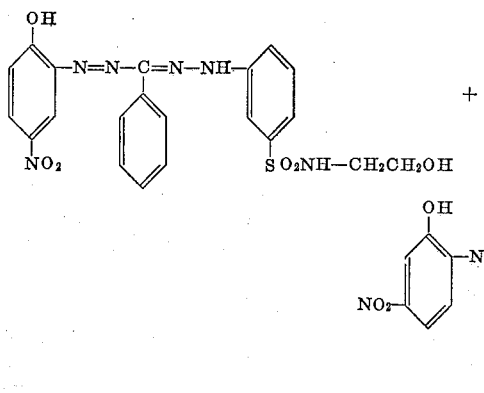

15 parts of cobalt acetate (corresponding to 3.54 parts of cobalt) are added at 80–85° to 24.2 parts of formazane dyestuff and 15.5 parts of monoazo dyestuff in 300 parts of dimethyl formamide. The formazane dyestuff obtained by coupling 4-nitro-2-diazo-1-hydroxybenzene with benzaldehyde phenylhydrazone-3-sulfonic acid-N-(β-hydroxyethyl)-amide, and the monoazo dyestuff is formed from 5-nitro-2-diazo-1-hydroxybenzene and 2-hydroxynaphthalene. The mixture is kept at 80–85° until no more starting dyestuffs can be detected. The cobalt-containing dyestuff is then precipitated by the addition of sodium chloride solution, filtered off, washed with dilute sodium chloride solution and dried. It is a dark powder which dyes wool from a neutral bath in navy blue shades. The dyeings have very good light and wet fastness properties, great depth of shade and good fastness to rubbing.

Similar dyestuffs are obtained if in this example the formazane dyestuff from 4-nitro-2-diazo-1-hydroxybenzene and benzaldehyde phenylhydrazone-3-sulfonic acid-N-(β-hydroxyethyl)-amide is replaced by 22 parts of formazane dyestuff from 4-nitro-2-diazo-1-hydroxybenzene and benzaldehyde phenylhydrazone-3- or -4-sulfonic acid amide.

Example 3

Chromium Complex

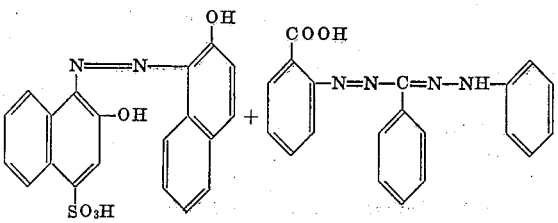

22.2 parts of the complex chromium compound of the type containing 1 chromium atom to 1 dyestuff molecule, which compound consists of 2.6 parts of chromium and 19.7 parts of the monoazo dyestuff obtained from diazotized 1-amino-2-hydroxynaphthalene-4-sulfonic acid and 2-hydroxynaphthalene, are added to 333 parts by volume of formamide. 17.2 parts of formazane dyestuff from diazotized 2-aminobenzene-1-carboxylic acid and benzaldehyde phenyl hydrazone are added to this solution. 15 parts of calcined sodium carbonate are added to the mixture which is then heated at 100–105° until the starting dyestuffs have disappeared. The chromium-containing dyestuff is precipitated by the addition of saturated sodium chloride solution, filtered off, washed with dilute sodium chloride solution and dried.

It is a dark powder which dyes wool and silk from a neutral to weakly acid bath in grey shades which have similar good fastness properties as the dyeings obtained in the preceding examples.

Similar dyestuffs are obtained if, in this example, the formazane dyestuff from diazotized 2-aminobenzene-1-carboxylic acid and benzaldehyde phenyl hydrazone is replaced by 25 parts of formazane dyestuff from diazotized 2-aminobenzene-1-carboxylic acid-5-sulfonic acid anilide and benzaldehyde phenyl hydrazone, 25.7 parts of formazane dyestuff from diazotized 2-aminobenzene-1-carboxylic acid-5-sulfonic acid-N-methyl anilide and benzaldehyde phenyl hydrazone or 22.8 parts of formazane dyestuff from diazotized 4-hydroxy-3-aminodiphenyl sulfone and benzaldehyde phenyl hydrazone.

Example 4

Cobalt Complex

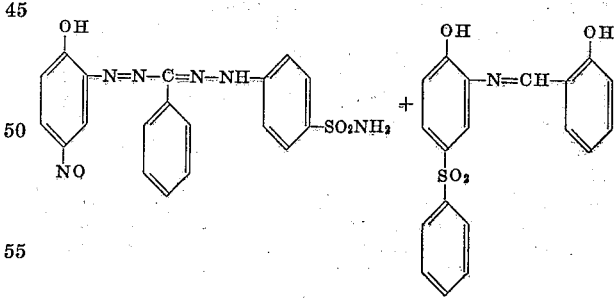

17.7 parts of azomethine dyestuff (obtained by condensation of 4-hydroxy-3-aminodiphenyl sulfone and salicylaldehyde) in 300 parts of formamide are added to 22 parts of formazane dyestuff obtained by coupling equimolecular amounts of 4-nitro-2-diazo-1-hydroxybenzene with benzaldehyde phenyl hydrazone-4-sulfonic acid amide and, at 80–85°, 15 parts of cobalt acetate, corresponding to 3.54 parts of cobalt, are added. The whole is stirred at this temperature until metal complex formation is complete. The metal-containing dyestuff is precipitated by dilution with concentrated sodium chloride solution, then filtered off, washed with dilute sodium chloride solution and dried. It is a dark powder which dyes wool from a neutral to weakly acid bath in beautiful olive green shades which have similar good fastness properties as the dyeings obtained in the preceding examples.

Similar dyestuffs are obtained if, in this example, the azomethine dyestuff from 4-hydroxy-3-aminodiphenyl sulfone and salicylaldehyde is replaced by 18.1 parts of azomethine dyestuff from 4-hydroxy-3-formyl azobenzene and 4-nitro-2-amino-1-hydroxybenzene or by 19.4 parts of azo methine dyestuff from 4-hydroxy-3-aminodiphenyl sulfone and 2-hydroxy-5-chlorobenzaldehyde.

*Example 5*

Cobalt complex

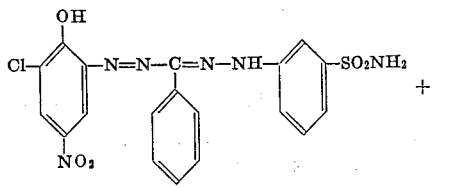

+

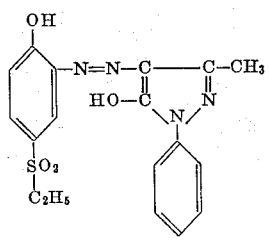

23.7 parts of formazane dyestuff obtained by coupling equimolar amounts of 4-nitro-6-chloro-2-diazo-1-hydroxybenzene with benzaldehyde phenyl hydrazone-3-sulfonic acid amide and 19.3 parts of monoazo dyestuff from 2-diazo 1-hydroxybenzene-4-ethyl sulfone and 1-phenyl-3-methyl-5-pyrazolone in 300 parts of formamide are heated at 80–85° with 15 parts of cobalt acetate, corresponding to 3.54 parts of cobalt, until metal complex formation is complete.

The cobalt-containing dyestuff is then precipitated by the addition of concentrated sodium chloride solution, filtered off, washed with dilute sodium chloride solution and dried. After drying, it is a dark powder which dyes wool from a neutral to weakly acid bath in brown-olive shades. The dyeings are level, of good depth and have high grade wet fastness and very good light fastness properties.

Similar dyestuffs having the same high grade fastness properties are obtained if, in this example, the monoazo dyestuff from 2-diazo-1-hydroxybenzene-4-ethyl sulfone and 1-phenyl-3-methyl-5-pyrazolone is replaced by 20 parts of the monoazo dyestuff from 2-diazo-1-hydroxybenzene-4-n-propyl sulfone and 1-phenyl-3-methyl-5-pyrazolone, by 18.6 parts of the monoazo dyestuff from 2-diazo-1-hydroxybenzene-4-sulfonic acid amide and 1-phenyl-3-methyl-5-pyrazolone, by 17 parts of the monoazo dyestuff from 4-nitro-2-diazo-1-hydroxybenzene and 1-phenyl-3-methyl-5-pyrazolone or by 16.4 parts of the monoazo dyestuff from 4-chloro-2-diazo-1-hydroxybenzene and 1-phenyl-3-methyl-5-pyrazolone.

*Example 6*

Cobalt complex

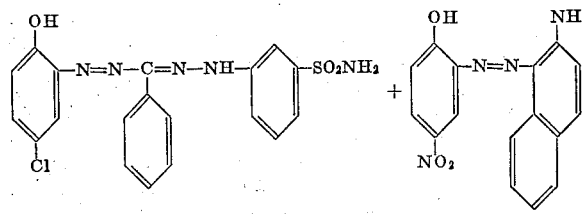

15 parts of cobalt acetate (corresponding to 3.54 parts of cobalt) are added at 80–85° to 21.5 parts of formazane dyestuff, obtained by coupling equimolecular amounts of 4-chloro-2-diazo-1-hydroxybenzene and benzaldehyde phenyl hydrazone-3-sulfonic acid amide, and to 15.4 parts of monoazo dyestuff obtained by coupling 4-nitro-2-diazo-1-hydroxybenzene and 2-aminonaphthalene, which dyestuff mixture is in 300 parts by volume of formamide. The whole is kept at this temperature until no more starting dyestuffs can be traced.

The cobalt-containing dyestuff is precipitated from the reaction mixture by diluting it with concentrated sodium chloride solution. It is then filtered off, washed with dilute sodium chloride solution and then dried.

After drying it is a dark powder which dyes wool from a neutral to weakly acid bath in olive grey shades of similar good fastness properties as the dyeings obtained in the preceding examples.

If in the above example, the monoazo dyestuff from 4-nitro-2-diazo-1-hydroxybenzene and 2-aminonaphthalene is replaced by 16.8 parts of monoazo dyestuff from 4-nitro-2-diazo-1-hydroxybenzene and 2-ethylaminonaphthalene or by 17.6 parts of the monoazo dyestuff from 4-nitro-2-diazo-1-hydroxybenzene and 2-(β-hydroxyethyl)-aminonaphthalene or by 19.2 parts of the monoazo dyestuff from 4-nitro-2-diazo-1-hydroxybenzene and 2-phenylaminonaphthalene, then dyestuffs having similar properties are obtained.

*Example 7*

Cobalt complex

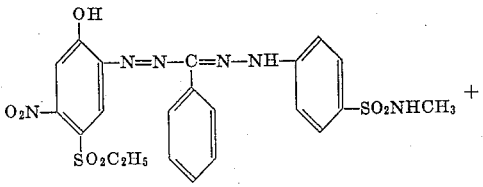

+

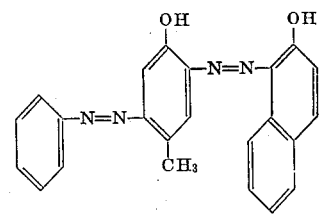

27.3 parts of formazane dyestuff obtained by coupling equimolecular amounts of 5-nitro-2-diazo-1-hydroxybenzene-4-ethyl sulfone with benzaldehyde phenyl hydrazone-4-sulfonic acid-N-methylamide and 19.1 parts of disazo dyestuff obtained from 3-hydroxy-6-methyl-4-diazobenzene and 2-hydroxynaphthalene, are heated at 80–85° in the presence of 300 parts by volume of dimethyl formamide, with 16 parts of cobalt acetate, corresponding to 3.54 parts of cobalt, until no more starting dyestuffs can be detected.

The cobalt-containing dyestuff is precipitated by diluting the reaction mixture with concentrated sodium chloride solution, and is then filtered off and dried.

After drying, it is a dark powder which dyes wool from a weakly acid or neutral bath in level olive-blue shades which have similar good fastness properties as the dyeings obtained in the preceding examples.

The corresponding chromium complex which is produced in the same manner as in the preceding example, but using an equivalent amount of chromium acetate in lieu of cobalt acetate, an equimolar amount of formamide in lieu of dimethyl formamide, and a temperature of 100–105° in lieu of 80–85° C., dyes wool under similar dyeing conditions olive-grey shades of similar good fastness properties.

*Example 8*

2 parts of the dyestuff according to Example 2 are dissolved in 4000 parts of water and, at 40–50°, 100 parts of previously wetted wool are introduced into the dyebath. The bath is brought to the boil within half an hour, kept at the boil for 45 minutes and then the wool is rinsed with cold water and dried.

The navy blue dyeing obtained has very good wet and light fastness properties.

If the formazane dyestuffs given in column II of the following Table I are reacted with the azo or azomethine compound given in column III and with a soluble salt of the metals given in column IV by the methods described in the previous examples 1 to 7, then similarly valuable dyestuffs are obtained, the metal complexes of which produce on wool the shades given in column V.

TABLE I

| I No. | II Formazane compound from— | III Azo or azomethine compound from— | IV Metal | V Shade of metal complex on wool |
|---|---|---|---|---|
| 9 | 4-nitro-2-diazo-1-hydroxybenzene→benzaldehyde phenyl hydrazone-3-sulphonic acid amide. | 4-nitro-2-diazo-1-hydroxybenzene→2-aminonaphthalene. | Co | Olive-grey. |
| 10 | do | 4-nitro-2-diazo-1-hydroxybenzene→2-(β-hydroxyethyl)-aminonaphthalene. | Co | Do. |
| 11 | do | 4-nitro-2-diazo-1-hydroxybenzene→1-phenyl-3-methyl-5-pyrazolone. | Co | Khaki. |
| 12 | do | 4-nitro-2-diazo-1-hydroxybenzene→1-phenyl-3-methyl-5-pyrazolone-(3'-sulphonic acid amide). | Co | Do. |
| 13 | do | 4-nitro-2-diazo-1-hydroxybenzene→acetoacetic acid anilide. | Co | Yellowish olive green. |
| 14 | do | 4-nitro-2-diazo-1-hydroxybenzene→2-hydroxynaphthalene. | Co | Violet brown. |
| 15 | do | 4-nitro-2-diazo-1-hydroxybenzene→1-phenyl-3-methyl-5-pyrazolone-3'-sulphonic acid. | Cr | Yellowish olive. |
| 16 | do | 4-nitro-2-diazo-1-hydroxybenzene→1-(3'-nitrophenyl)-3-methyl-5-pyrazolone. | Co | Khaki. |
| 17 | do | 4,6-dinitro-2-diazo-1-hydroxybenzene→2-hydroxynaphthalene. | Co | Black. |
| 18 | do | 2-diazo-1-hydroxybenzene-4-ethylsulphone→1-phenyl-3-methyl-5-pyrazolone. | Co | Olive khaki. |
| 19 | do | 2-diazo-1-hydroxybenzene-4-ethylsulphone→1-(3'-chlorophenyl)-3-methyl-5-pyrazolone. | Co | Do. |
| 20 | do | 2-diazo-1-hydroxybenzene-4-ethylsulphone→1-(4'-methoxyphenyl)-3-methyl-5-pyrazolone. | Co | Do. |
| 21 | do | 2-diazo-1-hydroxybenzene-4-ethylsulphone→2-hydroxynaphthalene. | Co | Raisin. |
| 22 | do | 4-chloro-2-diazo-1-hydroxybenzene→1-phenyl-3-methyl-5-pyrazolone. | Co | Olive brown. |
| 23 | do | 4,6-dinitro-2-diazo-1-hydroxybenzene→1-phenyl-3-methyl-5-pyrazolone. | Co | Brown. |
| 24 | do | 2-diazo-1-hydroxybenzene-4-methylsulphone→1-(4'-methylphenyl)-3-methyl-5-pyrazolone. | Co | Olive brown. |
| 25 | do | 4-phenylsulphonyl-2-diazo-1-hydroxybenzene-3'-sulphonic acid amide→2-hydroxynaphthalene-6-sulphonic acid amide. | Co | Brown-violet. |
| 26 | do | 2-diazo-1-hydroxybenzene-4-sulphonic acid→2-hydroxynaphthalene. | Cr | Violet-grey. |
| 27 | do | 6-nitro-1-diazo-2-hydroxynaphthalene-4-sulphonic acid→2-hydroxynaphthalene. | Cr | Grey-black. |
| 28 | do | 4-phenylazo-2-amino-1-hydroxybenzene+5-nitro-2-hydroxybenzaldehyde. | Co | Khaki. |
| 29 | do | 2-diazo-1-hydroxybenzene-4-sulphonic acid-(2'-carboxyphenyl)-amide→2-hydroxynaphthalene. | Co | Raisin. |
| 30 | 4-nitro-2-diazo-1-hydroxybenzene+4-chloro-2-diazo-1-hydroxybenzene→benzaldehyde phenyl hydrazone-4-sulphonic acid amide. | 5-nitro-2-diazo-1-hydroxybenzene→2-hydroxynaphthalene. | Co | Navy blue. |
| 31 | do | 5-nitro-4-chloro-2-diazo-1-hydroxybenzene→2-hydroxynaphthalene. | Co | Do. |
| 32 | do | 5-nitro-2-diazo-1-hydroxybenzene+5-nitro-4-chloro-2-diazo-1-hydroxybenzene→2-hydroxynaphthalene. | Co | Do. |
| 33 | 2-diazobenzene carboxylic acid→benzaldehyde-2,5-dichlorophenyl hydrazone. | 1-diazo-2-hydroxynaphthalene-4-sulphonic acid→2-hydroxynaphthalene. | Cr | Grey. |
| 34 | 2-diazobenzene carboxylic acid→2,6-dichlorobenzaldehyde-2,5-dichlorophenyl hydrazone. | do | Cr | Olive grey. |
| 35 | 2-diazobenzene carboxylic acid→benzaldehyde-3-chloro-6-(4'-chloro-2'-sulpho)-phenoxyphenyl hydrazone. | 4-nitro-2-diazo-1-hydroxybenzene→1-acetylamino-7-hydroxynaphthalene. | Cr | Do. |
| 36 | 2-diazobenzene carboxylic acid-5-sulphonic acid amide→benzaldehyde phenyl hydrazone. | 2-diazo-1-hydroxybenzene-4-methylsulphone→1-carbomethoxyamino-7-hydroxynaphthalene. | Cr | Do. |
| 37 | 4-nitro-2-diazo-1-hydroxybenzene→benzaldehyde phenyl hydrazone-4-sulphonic acid amide. | 2-diazo-1-hydroxybenzene-4-ethylsulphone→1-phenyl-3-methyl-5-pyrazolone. | Co | Olive-brown. |
| 38 | do | 2-diazo-1-hydroxybenzene-4-ethylsulphone→2-hydroxynaphthalene. | Co | Raisin. |
| 39 | do | 2-diazo-1-hydroxybenzene-4-ethylsulphone→acetoacetic acid-o-chloranilide. | Co | Olive green. |
| 40 | do | 4-nitro-2-diazo-1-hydroxybenzene→1-phenyl-3-methyl-5-pyrazolone. | Co | Yellowish olive green. |
| 41 | do | 2-diazo-1-hydroxybenzene-4-ethylsulphone→1-phenyl-3-methylpyrazolone+acetoacetic acid-o-chloranilide. | Co | Olive green. |
| 42 | N-di-(methylsulphonyl)-amino-2-diazobenzene→benzaldehyde phenyl hydrazone-3-sulphonic acid amide (saponified). | 5-nitro-2-diazo-1-hydroxybenzene→2-hydroxynaphthalene. | Co | Navy blue. |
| 43 | 4-nitro-2-diazo-1-hydroxybenzene→benzaldehyde phenyl hydrazone-4-sulphonic acid-N,N-bis-(β-hydroxyethyl)-amide. | do | Co | Do. |
| 44 | 6-acetylamino-2-diazo-1-hydroxybenzene-4-methylsulphone→benzaldehyde phenyl hydrazone-3-sulphonic acid amide. | do | Co | Do. |
| 45 | do | 4-nitro-2-amino-1-hydroxybenzene+2-hydroxy-1-naphthaldehyde. | Co | Khaki. |
| 46 | 5-nitro-2-diazo-1-hydroxybenzene-4-ethyl sulphone→furfurolphenyl hydrazone-3-sulphonic acid amide. | 2-diazo-1-hydroxybenzene-4-ethyl sulphone→1-phenyl-3-methyl-5-pyrazolone. | Co | Olive. |
| 47 | do | 2-diazo-1-hydroxybenzene-4-ethylsulphone→1-(3'-chlorophenyl))-3-methyl-5-pyrazolone. | Co | Do. |
| 48 | 4-chloro-2-diazo-1-hydroxybenzene→cyclohexylaldehyde phenyl hydrazone-3-sulphonic acid amide. | do | Co | Do. |
| 49 | do | 2-diazo-1-hydroxybenzene-4-ethyl sulphone→1-phenyl-3-methyl-5-pyrazolone. | Co | Do. |
| 50 | 2-diazo-1-hydroxybenzene-4-phenylsulphone-3'-sulphonic acid amide→butyraldehyde phenyl hydrazone-3-sulphonic acid amide. | do | Co | Do. |
| 51 | 2-diazo-1-hydroxybenzene-4-phenylsulphone-3'-sulphonic acid amide→crotonaldehyde phenyl hydrazone-3-sulphonic acid amide. | do | Co | Do. |

Example 52

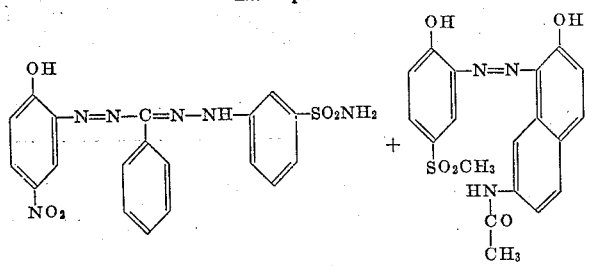

22 parts of formazane dyestuff, obtained by coupling diazotized 4-nitro-2-amino-1-hydroxybenzene with benzaldehyde phenyl hydrazone-3-sulfonic acid amide, and 20 parts of monoazo dyestuff, obtained by coupling diazotized 2-amino-1-hydroxybenzene-4-methyl sulfone and 1-acetylamino-7-hydroxynaphthalene, in 333 parts by volume of formamide are heated with 16 parts of chromic acetate, corresponding to 3.12 parts of chromium, in the presence of 15 parts of calcined sodium carbonate at 100–105° until the starting dyestuffs have disappeared.

The chromium-containing dyestuff is then precipitated by the addition of sodium chloride solution, filtered off, washed with dilute sodium chloride solution and dried.

It is a dark powder which dyes wool from a weakly acid to neutral bath in level olive grey shades of good fastness properties similar to those of the dyeings of the preceding examples.

Example 53

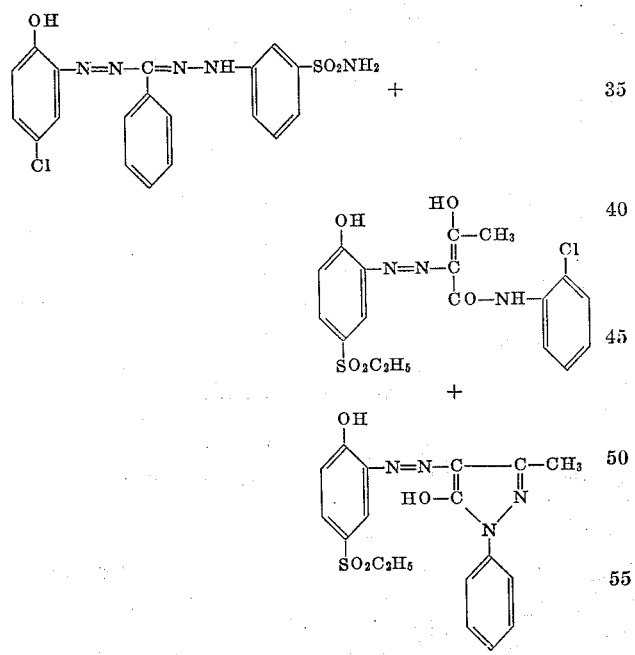

10.6 parts of monoazo dyestuff from diazotized 2-amino-1-hydroxybenzene-4-ethylsulfone and acetoacetic acid-o-chloranilide and 9.65 parts of monoazo dyestuff from diazotized 2-amino-1-hydroxybenzene-4-ethyl sulfone and 1-phenyl-3-methyl-5-pyrazolone in 350 parts of formamide are added at 80–85° to 21.5 parts of formazane dyestuff, obtained by coupling equimolar amounts of diazotized 4-chloro-2-amino-1-hydroxybenzene with benzaldehyde phenyl hydrazone. 15 parts of sodium carbonate and 15 parts of cobalt acetate, corresponding to 3.54 parts of cobalt, are then added and the whole is kept at this temperature until the metal complex formation is complete. The cobalt-containing dyestuff is precipitated by the addition of sodium chloride solution, filtered off and dried.

It is a dark powder which dyes wool from a neutral to weakly acid bath in olive shades. The dyeings have similar good fastness properties as those obtained in the preceding examples.

Example 54

Cobalt complex

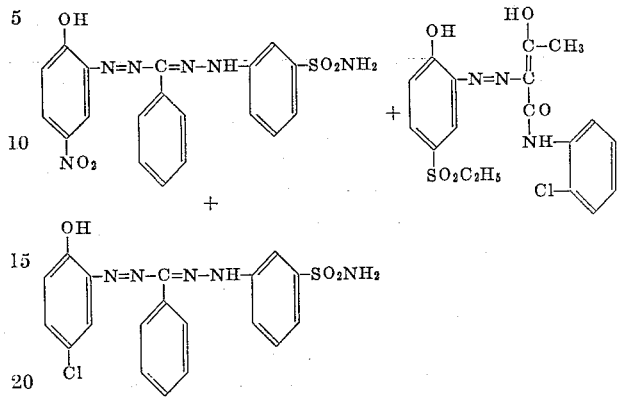

21.2 parts of monoazo dyestuff from diazotized 2-amino-1-hydroxybenzene-4-ethyl sulfone and acetoacetic acid o-chloranilide in 350 parts of formamide are added at 80–85° to 11 parts of formazane dyestuff obtained by coupling an equimolar amount of diazotized 4-nitro-2-amino-1-hydroxybenzene with benzaldehyde phenyl hydrazone-3-sulfonic acid amide, and 10.8 parts of formazane dyestuff obtained by coupling diazotized 4-chloro-2-amino-1-hydroxybenzene with the same hydrazone. 15 parts of cobalt acetate, corresponding to 3.54 parts of cobalt, and 15 parts of sodium carbonate are added and the whole is kept at the above temperature until metal complex formation is complete. The cobalt-containing dyestuff is precipitated by the addition of sodium chloride solution, filtered off and dried.

It is a dark powder which dyes wool from a neutral to weakly acid bath in level olive green shades. The dyeings have good wet fastness and good light fastness properties.

Example 54a

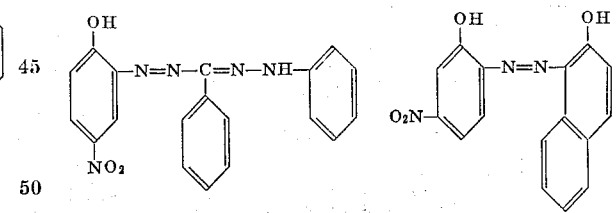

18.1 parts of formazane dyestuff obtained by coupling equimolar amounts of 4-nitro-2-diazo-1-hydroxybenzene with benzaldehyde phenylhydrazone and 15.5 parts of monoazo dyestuff obtained from 5 - nitro-2-diazo-1-hydroxybenzene and 2 - hydroxynaphthalene, are heated at 80–85° in the presence of 300 parts by volume of dimethyl formamide, with 15 parts of cobalt acetate (corresponding to 3.54 parts of cobalt), until no more starting dyestuffs can be traced.

The cobalt-containing dyestuff is precipitated by the addition of a concentrated sodium chloride solution, and is separated by filtration, washed with water and dryed.

After drying, it is a dark powder which dyes spinning masses of cellulose acetate in navy blue shades.

2.6 parts of the cobalt complex dyestuff obtained according to the above example are added to 1000 parts of a solution of cellulose acetate dissolved in acetone containing 26% of dry cellulose acetate. To this mixture 20 parts of acetone are added and the whole is mixed by rotating in a well closed tumbler flask until the dyestuff has completely dissolved.

The dyed spinning solution is then extruded through spinnerets and, after passing through a long heated tube, the threads formed can be wound directly onto spools. The dyed material has a navy blue colour.

The procedure of Examples 1, 2, 4 to 7, 9 to 14, 16 to 25, 28 to 32, 37 to 51, 53 and 54 is followed except that in lieu of the combination of a formazane dyestuff reactant with azo or azomethine dyestuff reactants used therein, there is used an equivalent quantity of each of the formazane dyestuffs produced from the reactants given in column II, III(a) and III(b) of the following Table II by the procedure given in Example 55, infra, in combination with each of the azo dyestuffs and azomethine dyestuffs used in Examples 1 to 54 inclusive, other than those already used in combination with the respective formazane dyestuff of Table II, infra, in one of the preceding examples; the corresponding cobalt metal mixed complexes falling under Formulas IV and V, respectively, being thereby obtained.

*Example 55*

[Production of a formazane dyestuff exemplifying making of formazanes falling under Formulas IIIA to IIIE].

15.4 parts of 4 - nitro - 2 - amino-1-hydroxybenzene are dissolved in 100 parts of hot water and 17.5 parts of concentrated hydrochloric acid, the solution is cooled to 5° and diazotized with a sodium nitrite solution (corresponding to 6.9 parts of sodium nitrite). The reaction mixture is made neutral by the addition of sodium bicarbonate. The yellow diazonium suspension is stirred at 0–3° into a solution of 28.8 parts of benzaldehyde phenyl hydrazone-3'-sulfonic acid amide (produced by condensation of benzaldehyde and phenylhydrazine - 3 - sulfonic acid amide) in 250 parts by volume of glycol monomethyl ether.

The coupling mixture is then rendered and kept strongly alkaline by the addition, at 0–5°, of 5 N sodium hydroxide solution. On completion of the dyestuff formation, the dyestuff is precipitated by the addition of 1000 parts by volume of saturated sodium chloride solution and filtered off. It is washed with dilute sodium chloride solution and is thus ready for use in a paste with water, cobalt acetate solution corresponding to 3.54 parts of cobalt, and another dyestuff reactant, as used in the preceding examples.

TABLE II

| I | II | III | | IV |
|---|---|---|---|---|
| No. | Diazonium compound | Hydrazone from— | | Shade of Co complex on wool |
| | | (a) Hydrazine | (b) Aldehyde | |
| 1 | 4-nitro-2-amino-1-hydroxybenzene | Phenylhydrazine-3-sulfonic acid amide | Benzaldehyde | |
| | | [III(b) being bonded in 1-position at the benzene nucleus of III(a)] | | |
| 2 | 2-amino-1-hydroxy-benzene-4-sulfonic acid-N-phenylamide-2',4',bis-sulfonic acid amide. | Phenylhydrazine | Benzaldehyde | |
| 3 | 4-phenylsulfonyl-2-aminophenyl-3'-sulfonic acid amide. | do | do | |
| 4 | 2-amino-1-hydroxybenzene-4-sulfonic acid-N-ethyl-N-phenylamide-4'-sulfonic acid amide. | do | do | |
| 5 | 3-amino-4-hydroxyacetophenone | Phenylhydrazine-3-sulfonic acid amide | do | |
| 6 | 5-nitro-4-ethylsulfonyl-2-amino-1-hydroxybenzene. | do | do | |
| 7 | 4-nitro-2-amino-1-hydroxybenzene | Phenylhydrazine-4-sulfonic acid amide | do | |
| 8 | 2-amino-1-hydroxybenzene-4-sulphonic acid-N-ethylphenylamide-4'-sulphonic acid amide. | Phenylhydrazine-3-sulphonic acid amide | do | Grey. |
| 9 | 4-phenylsulphonyl-2-amino-1-hydroxybenzene 3'-sulphonic acid amide. | do | do | Do. |
| 10 | 4-nitro-2-amino-1-hydroxybenzene | do | Furfurol | Greenish-grey. |
| 11 | 2-amino-1-hydroxybenzene-4-sulphonic acid-N-ethyl-N-phenyl-4'-sulphonic acid amide. | do | do | Grey. |
| 12 | 2-amino-1-hydroxybenzene-4-sulphonic acid amide. | do | do | Greenish-grey. |
| 13 | 4-chloro-2-amino-1-hydroxybenzene | do | do | Grey. |
| 14 | 2-amino-1-hydroxybenzene-4-sulphonic acid amide. | Phenylhydrazine | 2,6-dichlorobenzaldehyde | Violet-grey. |
| 15 | 4-nitro-2-amino-1-hydroxybenzene | Phenylhydrazine-3-sulphonic acid amide | do | Do. |
| 16 | do | do | 3,4-dichlorobenzaldehyde | Grey. |
| 17 | 4-phenylsulphonyl-2-amino-1-hydroxybenzene-3'-sulphonic acid amide. | do | Butyraldehyde | Reddish-grey. |
| 18 | 2-amino-1-hydroxybenzene-4-sulphonic acid-N-ethyl-N-phenylamide-4'-sulphonic acid amide. | do | do | Do. |
| 19 | 4-chloro-2-amino-1-hydroxybenzene | do | do | Reddish blue grey. |
| 20 | 4-phenylsulphonyl-2-amino-1-hydroxybenzene | do | do | Reddish-grey. |
| 21 | 2-amino-1-hydroxybenzene-4-sulphonic acid amide. | do | do | Do. |
| 22 | 2-amino-1-hydroxybenzene-4-sulphonic acid-N-methylamide. | do | do | Do. |
| 23 | 4-phenylsulphonyl-2-amino-1-hydroxybenzene-3'-sulphonic acid amide. | 4-nitrophenylhydrazine | Benzaldehyde | Olive grey. |
| 24 | 5-nitro-2-amino-1-hydroxybenzene | Phenylhydrazine-3-sulphonic acid amide | do | Blue-green. |
| 25 | 2-amino-1-hydroxybenzene-4-sulphonic acid amide. | 4-nitrophenylhydrazine | do | Olive-green. |
| 26 | 2-amino-1-hydroxybenzene-4-sulphonic acid amide. Plus 2-amino-1-hydroxybenzene-4-sulphonic acid methylamide. | Phenylhydrazine-3-sulphonic acid amide do | Benzaldehyde do | Grey. |
| 27 | 4-ethylsulphonyl-2-amino-1-hydroxybenzene | do | Benzaldehyde | Do. |
| 28 | do | Phenylhydrazine-3-sulphonic acid-N-methyl-N-β-hydroxyethylamide. | do | Do. |
| 29 | do | Phenylhydraxine-3-sulphonic acid-β-hydroxyethylamide. | do | Do. |
| 30 | do | Phenylhydrazine-3-sulphonic acid-N-ethyl-N-β-hydroxyethylamide. | do | Do. |
| 31 | do | Phenylhydrazine-4-sulphonic acid amide | do | Do. |
| 32 | do | Phenylhydrazine-4-sulphonic acid-N-methyl-N-βhydroxyethylamide. | do | Do. |
| 33 | do | Phenylhydrazine-4-sulphonic acid-N,N-di-β-hydroxyethylamide. | do | Do. |
| 34 | 4-nitro-2-amino-1-hydroxybenzene | 1-amino-naphthalene-4,7-di-sulphonic acid amide | do | Olive. |
| 35 | 4-chloro-2-amino-1-hydroxybenzene | do | do | Do. |
| 36 | 4-nitro-2-amino-1-hydroxybenzene | 4-methylphenylhydrazine | Benzaldehyde-4-sulphonicacid amide. | Grey. |
| 37 | do | 4-methoxyphenylhydrazine | do | Do. |
| 38 | 4-methylsulphonyl-6-nitro-2-amino-1-hydroxybenzene. | Phenylhydrazine-3-sulphonic acid amide | Benzaldehyde | Green-olive. |
| 39 | do | Phenylhydrazine-4-sulphonic acid amide | do | Do. |
| 40 | 4,6-dinitro-2-amino-1-hydroxybenzene | Phenylhydrazine-3-sulphonic acid amide | do | Do. |
| 41 | do | Phenylhydrazine-4-sulphonic acid amide | do | Do. |

TABLE II.—Continued

| No. | Diazonium compound | Hydrazone from— (a) Hydrazine | Hydrazone from— (b) Aldehyde | Shade of Co complex on wool |
|---|---|---|---|---|
| 42 | 4-nitro-6-acetylamino-2-amino-1-hydroxybenzene. | Phenylhydrazine-3-sulphonic acid amide | do | Greenish-grey. |
| 43 | 4-nitro-2-amino-1-hydroxybenzene | do | Hexahydrobenzaldehyde | Grey. |
| 44 | 4-chloro-2-amino-1-hydroxybenzene | Phenylhydrazine-4-sulphonic acid amide | 1,2,3,6-terrahydrobenzaldehyde. | Blue-grey. |
| 45 | 4-nitro-6-chloro-2-amino-1-hydroxybenzene | Phenylhydrazine-3-sulphonic acid methylamide. | 5-chloro-1,2,3,6-tetrahydrobenzaldehyde. | Grey. |
| 46 | 4-nitro-2-amino-1-hydroxybenzene | Phenylhydrazine-3-sulphonic acid amide | Croton aldehyde | Do. |
| 47 | do | Phenylhydrazine-4-sulphonic acid isopropyl amide. | do | Do. |
| 48 | 4-methylsulphonyl-6-acetylamino-2-amino-1-hydroxybenzene. | Phenylhydrazine-3-sulphonic acide amide | Benzaldehyde | Do. |
| 49 | do | Phenylhydrazine-4-sulphonic acid butylamide | do | Do. |
| 50 | do | Phenylhydrazine-4-sulphonic acid methylamide | do | Do. |
| 51 | 2-amino-1-hydroxybenzene-4-sulphonic acid butylamide. | Phenylhydrazine-3-sulphonic acid-N-methyl-N-β-hydroxyethylamide. | 4-methylbenzaldehyde | Do. |
| 52 | 2-amino-1-hydroxybenzene-4-sulphonic acid N,N-dimethyl amide. | Phenylhydrazine-3-sulphonic acid-β-cyan-ethylamide. | 3-methylbenzaldehyde | Do. |
| 53 | 2-amino-1-hydroxybenzene-4-sulphonic acid ethylamide. | Phenylhydrazine-4-sulphonic acid isopropylamide. | 4-methoxybenzaldehyde | Do. |
| 54 | 2-amino-1-hydroxybenzene-4-sulphonic acid propylamide. | Phenylhydrazine-4-sulphonic acid N,N-dimethylamide. | do | Do. |
| 55 | 4-nitro-2-amino-1-hydroxybenzene | Phenylhydrazine-3-sulphonic—acid amide | 2-methoxy-1-naphthaldehyde | Black-grey. |
| 56 | 4-methylsulphonyl-2-amino-1-hydroxybenzene | do | do | Grey. |
| 57 | 2-amino-1-hydroxybenzene-4-sulphonic acid morpholide. | Phenylhydrazine-3-sulphonic acid 4-methoxyethylamide. | do | Do. |
| 58 | do | Phenylhydrazine-3-sulphonic acid-N-ethyl-N-β-hydroxyethylamide. | 2-naphthaldehyde | Do. |
| 59 | 4-(N-methyl-N-acetylamino)-2-amino-1-hydroxybenzene. | Phenylhydrazine-3-sulphonic acid amide | Benzaldehyde | Bluish-grey. |
| 60 | 4-(N-methyl-N-methylsulphonylamino)-2-amino-1-hydroxybenzene. | do | do | Do. |
| 61 | 4-methylsulphonyl-6-carbomethoxyamino-2-amino-1-hydroxybenzene. | Phenylhydrazine-4-sulphonic acidj amide | do | Grey. |
| 62 | 4-methylsulphonyl-6-carbopropoxyamino-2-amino-1-hydroxybenzene. | do | do | Do. |
| 63 | 4-nitro-6-methyl-sulphonylamino-2-amino-1-hydroxybenzene. | do | do | Do. |
| 64 | 4-nitro-2-amino-1-hydroxybenzene | 4-methyl-3-phenylsulphonyl-phenylhydrazine-3'-sulphonic acid amide. | do | Olive-grey. |
| 65 | 4-nitro-6-acetylamino-2-amino-1-hydroxybenzene. | Phenylhydrazine-4-sulphonic acid amide | do | Grey. |
| 66 | do | Phenylhydrazine-3-sulphonic acid-β-hydroxyethyl amide. | do | Do. |
| 67 | 2-amino-1-hydroxybenzene-4-sulphonic acid amide. | 3-nitro-phenylhydrazine | do | Olive-grey. |
| 68 | do | 4-chlorophenylhydrazine | do | Grey. |
| 69 | do | 3-chlorophenylhydrazine | do | Do. |
| 70 | 4-amyl-6-nitro-2-amino-1-hydroxybenzene | Phenylhydrazine-3-sulfonic acid amide | do | Greenish-gray. |
| 71 | 4-chloro-5-nitro-2-amino-1-hydroxybenzene | do | do | Grey. |
| 72 | 4-chloro-6-nitro-2-amino-1-hydroxy benzene | do | do | Do. |
| 73 | 4-nitro-6-chloro-2-amino-1-hydroxybenzene | do | do | Do. |
| 74 | 4-bromo-2-amino-1-hydroxybenzene | do | do | Green-olive. |
| 75 | 6-nitro-2-amino-1-hydroxybenzene-sulfonic acid amide. | Phenyl-hydrazine | do | Do. |
| 76 | do | 4-methyl-3-phenylsulfonyl-phenylhydrazine-3'-sulfonic acid amide. | do | |
| 77 | 4-nitro-2-amino-1-hydroxybenzene | Phenylhydrazine-3-sulfonic acid amide | 2-methylbenzaldehyde | Grey. |
| 78 | do | do | 2-chlorobenzaldehyde | Reddish-grey. |
| 79 | do | do | Butyraldehyde | |
| 80 | 4-(N-phenyl-sulfamyl)-2-amino-1-hydroxybenzene. | do | furfuryl aldehyde | |
| 81 | 4-[N-(p-sulfamylphenyl)-N-ethyl]-sulfamyl-2-amino-1-hydroxybenzene. | Phenylhydrazine-3-(N-methyl-sulfamide) | do | |
| 82 | 4-N-(β-hydroxyethyl)-sulfamyl-2-amino-1-hydroxybenzene. | Phenylhydrazine-3-(N-β-hydroxyethyl)-sulfamide. | 1-naphthaldehyde | |
| 83 | 4-ethylsulfonyl-2-amino-1-hydroxybenzene | Phenylhydrazine-3-sulfamide | Furfuryl aldehyde | |
| 84 | 4-(3'-methylsulfonyl-phenyl-sulfonyl)-2-amino-1-hydroxybenzene. | do | Butyraldehyde | |
| 85 | do | do | Furfuryl aldehyde | |
| 86 | 4-methylsulfonyl-2-amino-1-hydroxybenzene | do | Benzaldehyde | Grey. |
| 87 | 4-chloromethylsulphonyl-2-amino-1-hydroxybenzene. | Phenylhydrazine | do | Do. |
| 88 | 4-trifluoromethylsulphonyl-2-amino-1-hydroxybenzene. | do | do | Do. |
| 89 | 4-methylsulphonyl-2-amino-1-hydroxybenzene. | do | do | Do. |
| 90 | 4-methylsulphonyl-6-acetylamino-2-amino-1-hydroxybenzene. | do | do | Do. |
| 91 | 4-methylsulphonyl-6-carbomethoxyamino-2-amino-1-hydroxybenzene. | do | do | Do. |
| 92 | 4-methylsulphonyl-6-propionylamino-2-amino-1-hydroxybenzene. | do | do | Do. |
| 93 | 4-methylsulphonyl-6-methylsulphonyl-amino-2-amino-1-hydroxybenzene. | do | do | Do. |
| 94 | 4-ethylsulphonyl-2-amino-1-hydroxybenzene | do | do | Do. |
| 95 | 4-butylsulphonyl-2-amino-1-hydroxybenzene | do | do | Do. |
| 96 | 5-nitro-4-ethylsulphonyl-2-amino-1-hydroxybenzene. | do | do | Olive-green. |
| 97 | 6-nitro-4-methylsulphonyl-2-amino-1-hydroxybenzene. | do | do | Do. |
| 98 | 4,6-dimethylsulphonyl-2-amino-1-hydroxybenzene. | do | do | Olive-grey. |
| 99 | do | 4-chlorophenylhydrazine | do | Do. |
| 100 | 4-phenylsulphonyl-2-amino-1-hydroxybenzene-3'-methylsulphone. | 4-methylphenylhydrazine | do | Grey. |
| 101 | 2-amino-1-hydroxybenzene-4-sulphonic acid phenylamide-4'-methylsulphone. | 4-methoxyphenylhydrazine | do | Do. |
| 102 | 2-amino-1-hydroxybenzene-4-sulphonic acid N-ethyl-N-phenylamide-4'-methylsulphone. | 4-ethoxyphenylhydrazine | do | Do. |
| 103 | 4-methylsulphonyl-2-amino-1-hydroxybenzene | Phenylhydrazine | 2-methoxy-1-naphthaldehyde. | Do. |
| 104 | do | do | 1-naphthaldehyde | Do. |

TABLE II.—Continued

| No. | Diazonium compound | Hydrazone from— | | Shade of Co complex on wool |
|---|---|---|---|---|
| | | (a) Hydrazine | (b) Aldehyde | |
| 105 | do | 1-naphthylhydrazine | Benzaldehyde | Olive-grey. |
| 106 | do | Phenylhydrazine | 4-methyl-benzaldehyde | Grey. |
| 107 | do | do | 4-methoxy-benzaldehyde | Do. |
| 108 | do | 4-nitrophenylhydrazine | Benzaldehyde | Olive-grey. |
| 109 | do | 3-nitrophenylhydrazine | do | Do. |
| 110 | 4-chloromethylsulphonyl-2-amino-1-hydroxybenzene. | 4-nitrophenylhydrazine | do | Olive-green. |
| 111 | 4-methylsulphonyl-2-amino-1-hydroxybenzene. | 2,5-dichlorophenylhydrazine | 2-6,dichlorobenzaldehyde | Violet. |
| 112 | do | do | Benzaldehyde | Grey violet. |

We claim:
1. A cobalt metal complex dyestuff which dyestuff consists essentially of a mixture of
    (a) a bicyclically metallized dyestuff moiety selected from the group consisting of a monazo dyestuff moiety, a disazo dyestuff moiety and an azomethine dyestuff moiety, and
    (b) a bicyclically metallized formazane dyestuff moiety; said dyestuff moieties (a) and (b) being complexed by cobalt in a ratio of one cobalt atom for every two moles of dyestuff moieties; and the molar ratio of (a):(b) ranging from 2:1 to 1:2.
2. A dyestuff as described in claim 1, wherein the ratio of (a):(b) is about 1:1.
3. A chromium metal complex dyestuff which dyestuff consists essentially of a mixture of
    (a) a bicyclically metallized dyestuff moiety selected from the group consisting of a monazo dyestuff moiety, a disazo dyestuff moiety and an azomethine dyestuff moiety, and
    (b) a bicyclically metallized formazane dyestuff moiety; said dyestuff moieties (a) and (b) being complexed by chromium in a ratio of one chromium atom for every two moles of dyestuff moieties; and the molar ratio of (a):(b) ranging from 2:1 to 1:2.
4. A chromium metal mixed complex dyestuff which dyestuff consists essentially of
    (a) a bicyclically metallized dyestuff moiety selected from the group consisting of a monazo dyestuff moiety, a disazo dyestuff moiety and an azomethine dyestuff moiety, complexed in a molar ratio of 1:1 with chromium metal, the resulting chromium 1:1 complex being reacted with complex formation with
    (b) a bicyclically metallized formazane dyestuff, the ratio of (a) to (b) in the resulting mixed complex dyestuff being about 1:1.
5. A 1:2 cobalt-metal complex dyestuff consisting essentially of the metal-complexed radical of the dyestuff of the formula
    (a)

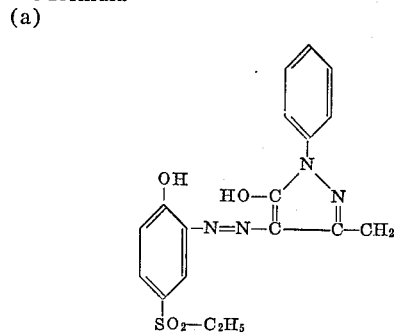

(b) the metal-complexed moiety of a dyestuff of the formula

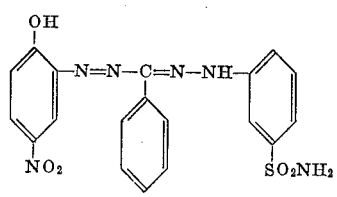

and cobalt as the common complexing metal for both moieties.

6. A 1:2 cobalt-metal complex dyestuff consisting essentially of the metal-complexed radical of the dyestuff of the formula
    (a)

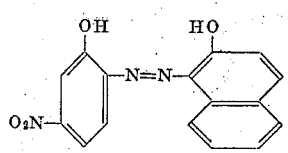

(b) the metal-complexed moiety of a dyestuff of the formula

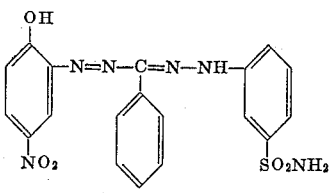

and cobalt as the common complexing metal for both moieties.

7. A 1:2 cobalt-metal complex dyestuff consisting essentially of the metal-complexed radical of the dyestuff of the formula
    (a)

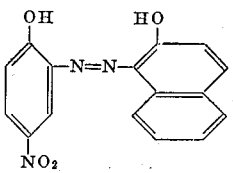

(b) the metal-complexed moiety of a dyestuff of the formula

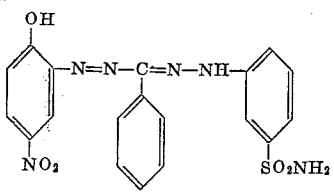

and cobalt as the common complexing metal for both moieties.

8. A 1:2 cobalt-metal complex dyestuff consisting essentially of the metal-complexed radical of the dyestuff of the formula
    (a)

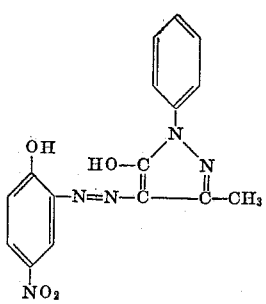

(b) the metal-complexed moiety of a dyestuff of the formula

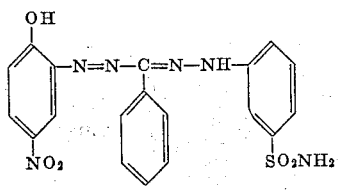

and cobalt as the common complexing metal for both moieties.

9. A 1:2 chromium-complex dyestuff consisting essentially of the metal-complexed radical of the dyestuff of the formula
(a)

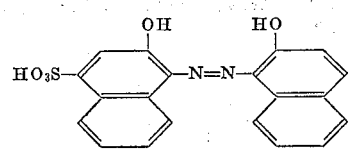

(b) the metal-complexed moiety of a dyestuff of the formula

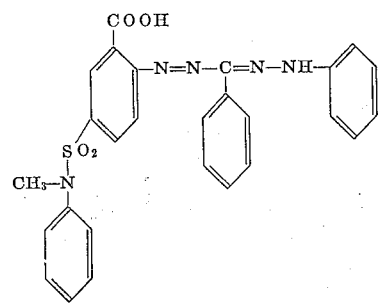

and chromium as the common complexing-metal for both moieties.

No references cited.

CHARLES B. PARKER, Primary Examiner.

R. J. FINNEGAN, D. M. PAPUGA, Assistant Examiners.